United States Patent [19]
Godon et al.

[11] Patent Number: 6,081,089
[45] Date of Patent: Jun. 27, 2000

[54] DRIVE SYSTEM

[75] Inventors: Fernand Godon, Boechout; Luc Horemans, Aartselaar; Jan Zwijsen, Wilrijk, all of Belgium

[73] Assignee: Agfa-Gevaert N.V., Mortsel, Belgium

[21] Appl. No.: 09/067,813

[22] Filed: Apr. 28, 1998

Related U.S. Application Data

[60] Provisional application No. 60/070,586, Dec. 11, 1997.

[30] Foreign Application Priority Data

May 1, 1997 [EP] European Pat. Off. ............. 97202947

[51] Int. Cl.⁷ ..................................................... G05B 11/01
[52] U.S. Cl. ..................... 318/560; 318/561; 346/76 PH
[58] Field of Search .................................. 318/560–696, 318/254; 101/93.19, 242; 271/246; 400/611, 234, 630, 225, 236; 355/236, 208, 52, 327; 33/733, 754, 732; 399/167; 347/115, 116; 346/76 PH; 74/665 GA, 665 GE

[56] References Cited

U.S. PATENT DOCUMENTS

| | | |
|---|---|---|
| 4,407,003 | 9/1983 | Fukui ......................................... 346/76 |
| 4,442,769 | 4/1984 | Kallin .................................... 101/93.19 |
| 4,519,700 | 5/1985 | Barker et al. ......................... 355/3 SH |
| 4,723,145 | 2/1988 | Takada et al. ......................... 355/3 TR |
| 4,788,558 | 11/1988 | Caldwell et al. .................... 346/76 PH |
| 5,153,644 | 10/1992 | Yang et al. .............................. 355/236 |
| 5,267,401 | 12/1993 | Freeman et al. .......................... 33/733 |
| 5,412,302 | 5/1995 | Kido et al. ............................... 318/685 |
| 5,433,539 | 7/1995 | German ................................... 400/225 |
| 5,444,525 | 8/1995 | Takahashi et al. ...................... 355/327 |
| 5,820,280 | 10/1998 | Fox ......................................... 400/611 |
| 5,884,135 | 3/1999 | Moore ..................................... 399/361 |
| 5,905,927 | 5/1999 | Inoue et al. ............................. 399/167 |
| 5,937,241 | 8/1999 | Kumar et al. ........................... 399/111 |
| 5,962,783 | 10/1999 | Iwata et al. ............................... 73/488 |

FOREIGN PATENT DOCUMENTS

| | | |
|---|---|---|
| 0377835 | 11/1989 | European Pat. Off. . |
| 0680829 | 8/1995 | European Pat. Off. . |
| 0724964 | 7/1996 | European Pat. Off. . |
| 4211982 | 10/1993 | Germany . |
| 58-033484 | 2/1983 | Japan . |

*Primary Examiner*—Paul Ip
*Attorney, Agent, or Firm*—Baker Botts L.L.P.

[57] ABSTRACT

Drive system for driving a load (20), the drive system including a motor (10) coupled to a first shaft (11), a second shaft (19) coupled to the load, and an intermediate shaft (15) coupled to the first shaft and coupled to the second shaft. The angular position of the intermediate shaft is converted by a rotational encoder (25) into a drive signal for driving the motor.

11 Claims, 3 Drawing Sheets

DRIVE SYSTEM

This application claims the benefit of U.S. provisional Application No. 60/070,586 filed Dec. 11, 1997.

FIELD OF THE INVENTION

The present invention relates to a drive system to drive a load by means of a motor, in particular a load that is sensitive to shocks.

BACKGROUND OF THE INVENTION

To drive a rotatable load, it is well known to use a motor and a drive system. The drive system transmits the power supplied by the motor to the load, and transforms the motor torque and speed to the torque and speed required by the load; usually the load requires a higher torque than the one provided by the motor, but at a lower speed. In a number of steps, called transmission steps, the motor power is transmitted to the load, while each transmission step provides a lower speed and at the same time a higher torque. An example of a drive system is the gearbox of a car—or the automatic transmission, in which case the gear is changed automatically.

Common drive systems comprise mechanical components such as gears, belts, chains, or combinations thereof.

The purpose of a drive system is driving the load at a chosen angular speed, keeping this speed substantially constant, in spite of load variations, and minimizing shocks experienced by the load, i.e. sudden decelerations or accelerations. Shocks can be caused by the motor, e.g. a stepper motor creates accelerations and decelerations; they can be caused by load variations; they can also be introduced by the drive system itself.

A drive system consisting of gear transmissions creates shocks at every engagement and disengagement of the teeth.

By making use of a timing belt, the engagement and the disengagement of the teeth of the belt with its belt pulleys causes minute accelerations and decelerations.

The extent of accelerations and decelerations of course depends on what the load can tolerate. By way of example, hereinafter the drive system of the print drum of a thermal printer will be described. In this case, most accelerations and decelerations of the load, i.e. the print drum, are visible in the image produced by the printer. Whether a shock on the print drum is visible or not in the printed image depends on its amplitude and its frequency.

Thermal imaging or thermography is a recording process wherein images are generated by the use of image-wise modulated thermal energy.

In thermography two approaches are known:

1. Direct thermal formation of a visible image pattern by the image-wise heating of a recording material containing matter that by chemical or physical process changes colour or optical density.
2. Thermal dye transfer printing wherein a visible image pattern is formed by transfer of a coloured species from an image-wise heated donor element into a receptor element.

Common thermal printers comprise a rotatable drum and an elongated thermal head which is spring-biased towards the drum to firmly line-wise contact a heat-sensitive material which is passed between the head and the drum.

The thermal head includes a plurality of heating elements and corresponding drivers and shift registers for these elements. The image-wise heating of a sheet is performed on a line by line basis. The heating resistors are geometrically juxtaposed along each other in a bead-like row running parallel to the axis of the drum. Each of these resistors is capable of being energised by heating pulses, the energy of which is controlled in accordance with the required density of the corresponding picture element.

In direct thermal image formation, a single heat-sensitive sheet is conveyed between the thermal head and the drum, and the image is directly produced on the sheet. The sheet is not attached to the drum but is advanced between the head and the drum by frictional contact of its rearside with the drum.

Medical diagnostics are an application area of direct thermal printing; here an image is produced on a transparent sheet, a polyethylene terephthalate support in particular.

In thermal dye transfer, the sheet—i.e. the image receiving sheet—is usually attached to the rotatable drum, and a dye donor sheet or web is conveyed by frictional contact with the rotating sheet past the thermal head.

In practising the thermal printing technique described hereinbefore, the image quality may be spoiled by a defect which will be called "banding" hereinafter, and which is characterized by transverse zones (i.e. parallel with the thermal head) on the final print of slightly increased and/or reduced optical density which are particularly visible in the areas of lower optical density, say smaller than 1.0.

A known cause for this type of defect is the drive system for the drum. The drive system can cause minute accelerations and decelerations, leading to corresponding reductions and prolongations of the printing time.

In a known prior art system, the print drum is driven by a sequence of timing belts: the motor drives a first intermediate shaft via a first timing belt, this first intermediate shaft drives a second intermediate shaft via a second timing belt, and the second intermediate shaft drives the print drum via a third timing belt. Since the engagement and the disengagement of the teeth of each timing belt with its belt pulleys causes minute accelerations and decelerations, such a drive system contributes significantly to the banding defect.

We have found that severe banding can occur when a substantially white line in the image is followed by a substantially black line. In this case, the resistors in the thermal head very suddenly have to provide a large quantity of thermal energy. When writing the substantially white line, the heat-sensitive material is nearly not heated, while when writing the substantially black line, a large quantity of heat is supplied by the resistors in the thermal head. As a consequence, the thermal head sinks into the heat-sensitive material, thus causing a large increase of the friction force between thermal head and heat-sensitive material. This increase of friction, which will be called "frictional shock" hereinafter, causes an important deceleration of the print drum.

Banding created by the timing belts is an example of shocks caused by the drive system, whereas the frictional shock is an example of a shock caused by a load variation.

Both types of shocks cause defects that are visible in the printed image.

Besides the problem of shocks, a second problem in drive systems is keeping the angular speed of the load substantially constant, in spite of load variations. A stepper motor drives its load at a constant speed; however, as mentioned hereinbefore, a stepper motor creates shocks itself. A DC-motor operates substantially shock-free, but the speed of a DC-motor changes considerably with load variations. A known solution to this problem is to place a rotational encoder on the same shaft as the load. The encoder converts the angular position of the load into a drive signal; this drive signal is used to drive the DC-motor. If the angular speed of the load decreases, less pulses per second are registered by the encoder, and the drive signal to the motor is adjusted accordingly.

A drawback of this method is the cost of the encoder: to measure the angular position of the load with sufficient accuracy, a high resolution encoder is required, providing a very high number of pulses per revolution of the load.

OBJECTS OF THE INVENTION

It is an object of the present invention to provide a method for driving a load that substantially guards the load from shocks.

It is a further object of the invention to provide an affordable method for keeping the angular velocity of the load substantially constant.

It is another object of the present invention to provide a drive system that avoids shocks experienced by the load.

It is a further object of the invention to provide an affordable drive system, that keeps the angular velocity of the load substantially constant.

It is yet another object of the present invention to provide a thermal printer with an improved image quality, in particular with respect to banding.

SUMMARY OF THE INVENTION

The above mentioned objects are realised by a method, comprising the steps defined in claim 1.

The above mentioned objects are realised by a drive system, having the specific features defined in claim 7.

The above mentioned last object is realised by a thermal printer, having the specific features defined in claim 11.

Specific features for preferred embodiments of the invention are set out in the dependent claims.

Further advantages and embodiments of the present invention will become apparent from the following detailed description and drawings.

The term "coupled" stands for a direct or an indirect interconnection; in an indirect interconnection, the coupled objects are interconnected via other objects. An example of two coupled shafts, called "first" and "second" shaft, is the following: the first shaft supports a first belt pulley, the second shaft supports a second belt pulley, a belt runs over the first and over the second pulley. Another example is the following: the first shaft drives a gear transmission, this gear transmission drives an intermediate shaft via a first belt, the intermediate shaft holds a belt pulley via an elastic coupling, on this belt pulley runs a second belt driving the second shaft.

A timing belt is a belt comprising teeth—as opposed to a flat belt. The belt pulleys of a timing belt also comprise teeth.

A rotational encoder converts a rotational speed into a number of electrical pulses per second, proportional to that speed. To measure the instantaneous speed of a shaft, a rotational encoder can be mounted onto the shaft. Generally, a rotational encoder comprises a disc with alternating black and white marks; when a black mark passes a fixed point in the encoder, a pulse is generated. A high resolution encoder comprises a disc with a high number of marks; it can measure a rotational speed more accurately, but it is also more expensive.

A PDD-controller, or proportional derivative double derivative controller, generates an output signal by using one or more input signals, the derivatives of these input signals, and the second derivatives of these input signals. A PDD-controller pertains to the field of control system theory. The best known type of controller is a PID- or proportional integrating derivative controller.

BRIEF DESCRIPTION OF THE DRAWINGS

The invention is described hereinafter by way of example with reference to the accompanying figures, wherein.

DETAILED DESCRIPTION OF THE INVENTION

Figure 1:
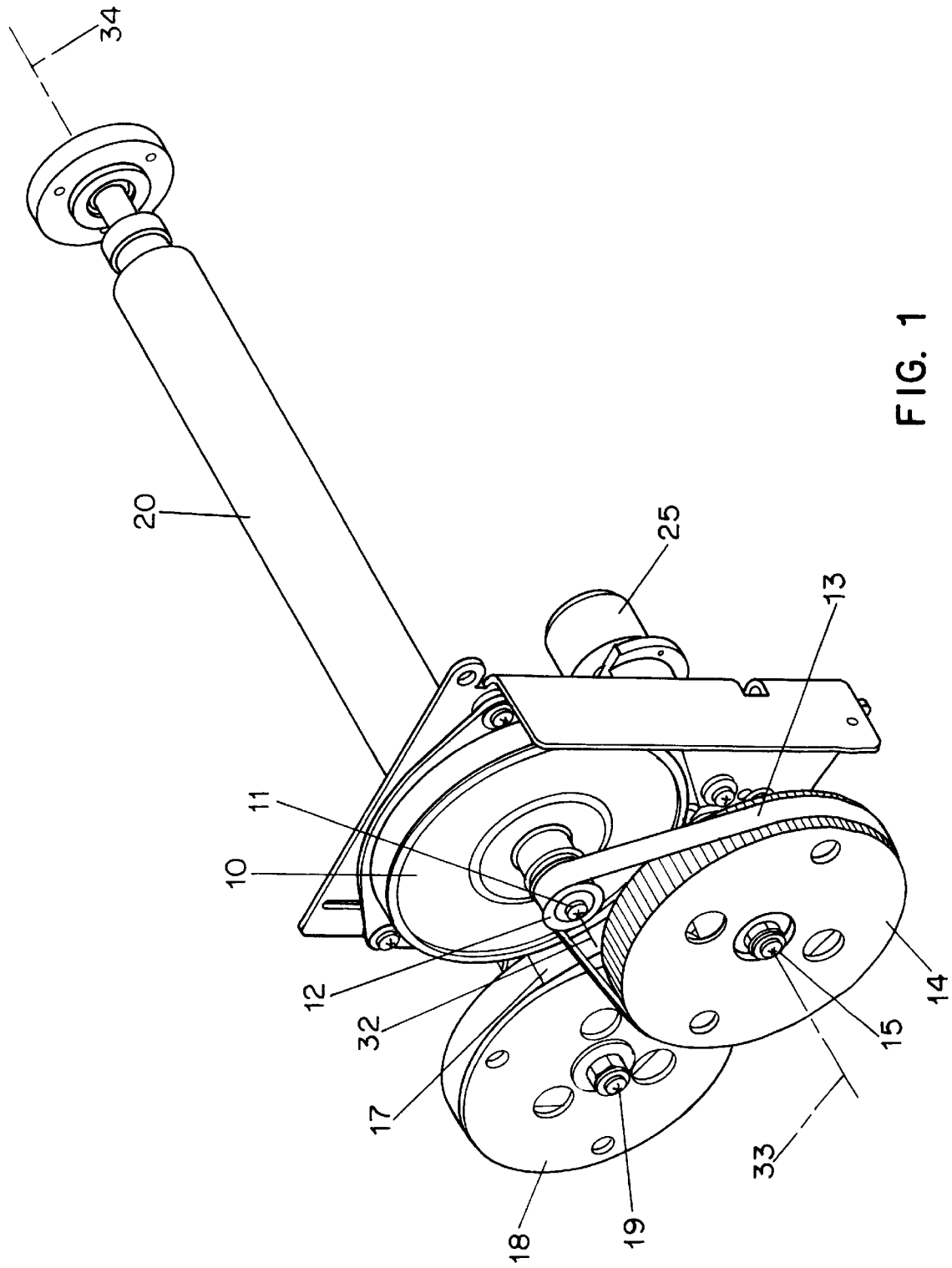
FIG. 1 shows an embodiment of a drive system in accordance with the present invention.

FIG. 1 shows an embodiment of a drive system wherein a motor 10 on a first shaft 11 is driving a load 20 on a second shaft 19, via an intermediate shaft 15. The axis of the motor 10 is axis 32; the axis of the intermediate shaft 15 is axis 33; the axis of the load 20 is axis 34. The first shaft 11 holds the motor 10 and a pulley 12. Preferably the motor 10 is a DC-motor. The pulley 12 is connected via a timing belt 13 to a pulley 14 on the intermediate shaft 15. The intermediate shaft also holds a rotational encoder 25 and another pulley 16, not shown. The pulley 16 is connected via a flat belt 17 to a pulley 18 on shaft 19. Shaft 19 holds load 20.

A drive system according to the present invention is not limited to the embodiment shown in FIG. 1. The drive system may have more than two transmission steps; it may e.g. have three, four or more transmission steps, which means it may have two, three or more intermediate shafts. A transmission step preferably comprises a belt, but it may comprise gears, a chain, or other mechanical components.

The motor may rotate at different speeds, depending on the application.

The rotational encoder 25 converts the angular velocity of the intermediate shaft 15 into an electronic signal consisting of a number of pulses per second; this electronic signal is integrated to obtain a position signal, representing the angular position of the intermediate shaft.

The position signal is fed to controlling means. This controlling means converts the position signal into a drive signal for the motor: if the angular speed of the load decreases, fewer pulses per second are registered by the encoder, and the controlling means sends a drive signal to the motor to increase its speed, so that the speed of the load is kept substantially constant, in spite of load variations.

In a preferred embodiment, the controlling means comprises a proportional derivative double derivative (=PDD) controller.

In a more preferred embodiment, the intermediate shaft 15, holding the encoder 25, is coupled to the first shaft 11 holding the motor 10 via one or more transmission steps consisting of timing belts only, excluding gears, chains and flat belts.

In a still more preferred embodiment, the intermediate shaft 15 is coupled to the second shaft 19 via one transmission step consisting of a flat belt.

A still more preferred embodiment comprises means for measuring a transmission ratio between the intermediate shaft 15 and the second shaft 19.

Several advantages are associated with placing the encoder 25 on the intermediate shaft 15, instead of placing it on the shaft 19 holding the load.

A first advantage is that a lower cost encoder can be used. The angular speed of the intermediate shaft is lower than the motor speed and higher than the load speed. By way of example, the angular speed of shaft 19 holding the load can be 2.8 rev/min, while the angular speed of the intermediate shaft 15 is 23 rev/min. Thus, for every revolution of the load, the intermediate shaft makes 23/2.8=8 revolutions. To obtain the angular position of the load with a certain accuracy, instead of using an encoder generating e.g. 24000 pulses per revolution on the shaft 19, an encoder generating 24000/8= 3000 pulses per revolution on the intermediate shaft 15 suffices. Such an encoder is much less expensive.

A second advantage of placing the encoder on the intermediate shaft 15 is concerned with system control, more particularly with resonance frequencies. We made a mathematical model, for system control theory, of the drive system, the motor and the load. Using this model, we have found that if the encoder 25 is placed on the shaft 19, holding the load, this has the drawback that all resonances of motor, drive system and load, including low frequency resonances, are included in the closed loop of the control system. This closed loop consists of the motor 10, all the elements constituting the portion of the drive system coupling the motor to the encoder 25, and the controlling means receiving the signal from the encoder and driving the motor. The presence of these resonances is disadvantageous in controlling the motor speed. On the other hand, placing the encoder on the intermediate shaft 15 keeps the low frequency resonances associated with the load 20 outside of the control loop.

A third advantage of placing the encoder on the intermediate shaft 15 is that all shocks and disturbances introduced "before" the encoder, i.e. in the motor itself and between the motor and the encoder, are detected by the encoder, and thus, are passed on to the controlling means. So, it is advantageous to have only a few components between the intermediate shaft 15 and the load—without however placing the encoder on the shaft 19 holding the load, for the reason explained in the previous paragraph. Examples of the above mentioned shocks and disturbances are: misalignment of shafts or pulleys, unequal distances between the teeth of a timing belt, the engagement and the disengagement of the teeth of a timing belt with its pulleys, etc.

As mentioned hereinbefore, a preferred embodiment comprises the intermediate shaft 15 driving the load 20 on shaft 19 via one transmission step comprising a flat belt. In this way, all shocks and disturbances introduced "before" the intermediate shaft are dealt with by the controlling means driving the motor. Further, the last transmission step driving the load preferably comprises a flat belt, since a flat belt does not introduce any shocks due to the engagement or disengagement of teeth, as opposed to gears, a timing belt or a chain.

For coupling the motor 10 to the intermediate shaft 15, preferably timing belts are used, since shocks and disturbances ate partly compensated for by the elasticity and the damping of the belts. Moreover, as opposed to flat belts, timing belts enforce a fixed transmission ratio, i.e. the speed of the driven belt pulley divided by the speed of the driving pulley is a fixed number (equal to the ratio of the number of teeth of both pulleys). On the contrary, the transmission ratio of a flat belt varies a little. On the one hand, a flat belt slips a little over the belt pulleys, which lowers the transmission ratio. On the other hand, the transmission ratio depends upon the position of the neutral layer of the flat belt, which varies a little with temperature, relative humidity, belt load, and which also varies from belt to belt. The neutral layer of a belt is the layer having the same length after deformation—the belt is deformed because it is bent around the pulleys—as it had before deformation; an outer layer, i.e. a layer further away from the shaft center than the neutral layer, is stretched, while an inner layer is compressed. To limit slip, belt stress can be increased. This means that bearing forces increase too, implicating a more expensive construction. Thus, timing belts are preferred to drive the intermediate shaft 15, because they have elastic and damping properties, they enforce a fixed transmission ratio, and they allow for an inexpensive construction. For the last transmission step, driving the load, a flat belt is preferred, because of its elastic and damping properties, and because it does not introduce extra shocks—especially important in the last transmission step. The variation of the transmissior ratio is taken care of by means for measuring the transmission ratio between the shaft 19 and the intermediate shaft 15, as shown in FIG. 2, and described hereinafter.

The embodiments disclosed hereinbefore are preferred embodiments, but the present invention is not limited to these embodiments. The first shaft 11 may e.g. be coupled to the intermediate shaft 15 via a combination of gears, chains and belts, while elastic and non-elastic coupling elements may be used as well. The same holds for the way in which the second shaft 19 is coupled to the intermediate shaft 15.

Figure 2:
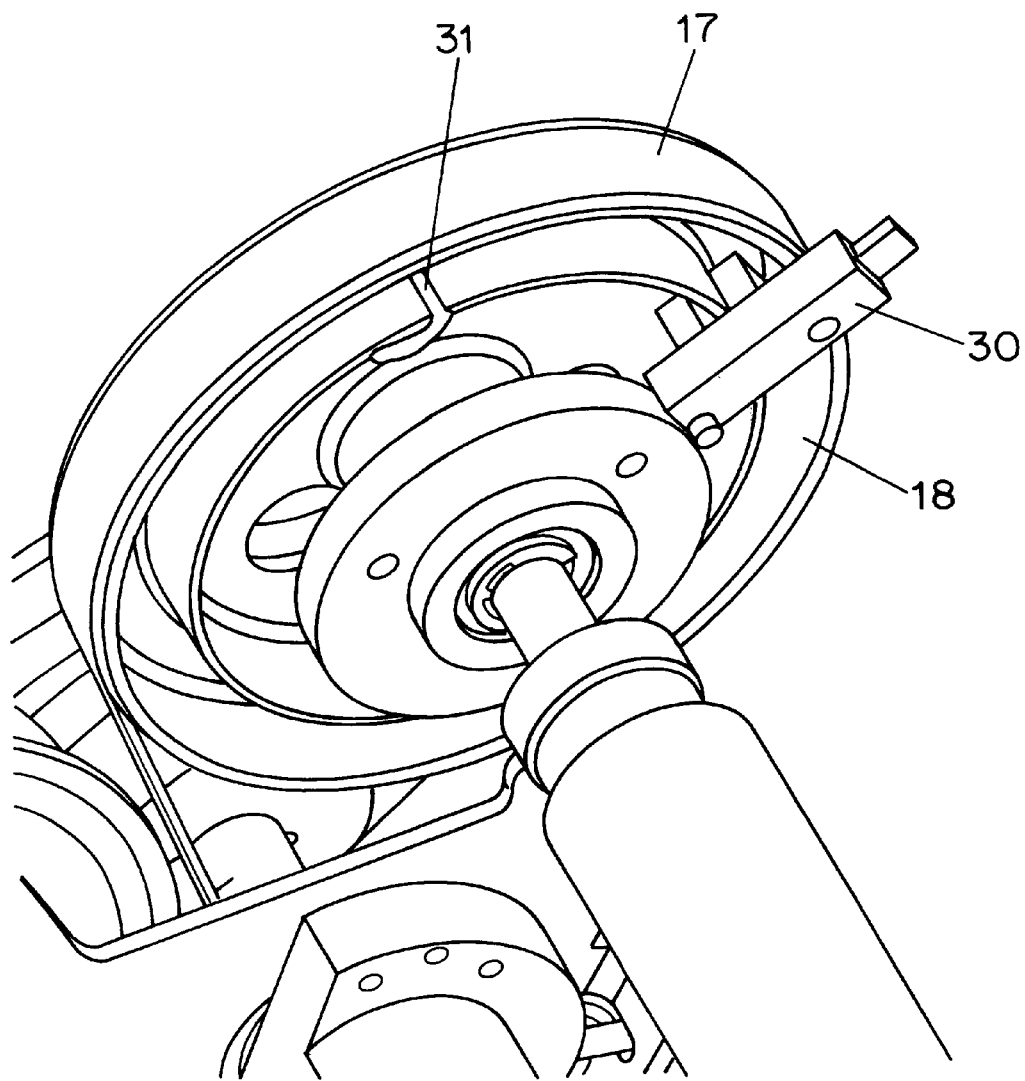
FIG. 2 is a detailed view of this embodiment, showing means for measuring a transmission ratio.

FIG. 2 shows an embodiment for measuring the transmission ratio between the shaft 19 and the intermediate shaft 15. A slit 31 is made into a cylindrical rim of the pulley 18 that is counted on shaft 19. When shaft 19 rotates, the slit 31 is detected by means of a fixed optical slit sensor 30, connected to the frame (not shown). Thus, sensor 30 provides one pulse for every revolution of shaft 19.

The encoder 25 on shaft 15 provides a number of pulses for every revolution of shaft 15. Out of the pulse signals of encoder 25 and sensor 30, the number of revolutions is calculated that the intermediate shaft 15 makes per revolution of shaft 19, i.e. the transmission ratio between both shafts.

The transmission ratio is fed to the controlling means, that converts the transmission signal and the position signal provided by the encoder into a drive signal for motor 10.

The embodiment disclosed hereinbefore is a preferred embodiment, but the present invention is not limited to this embodiment: the transmission ratio can e.g. also be measured by another sensor, e.g. by an encoder on shaft 19. Using an optical slit sensor is advantageous, because this sensor is inexpensive.

Figure 3:
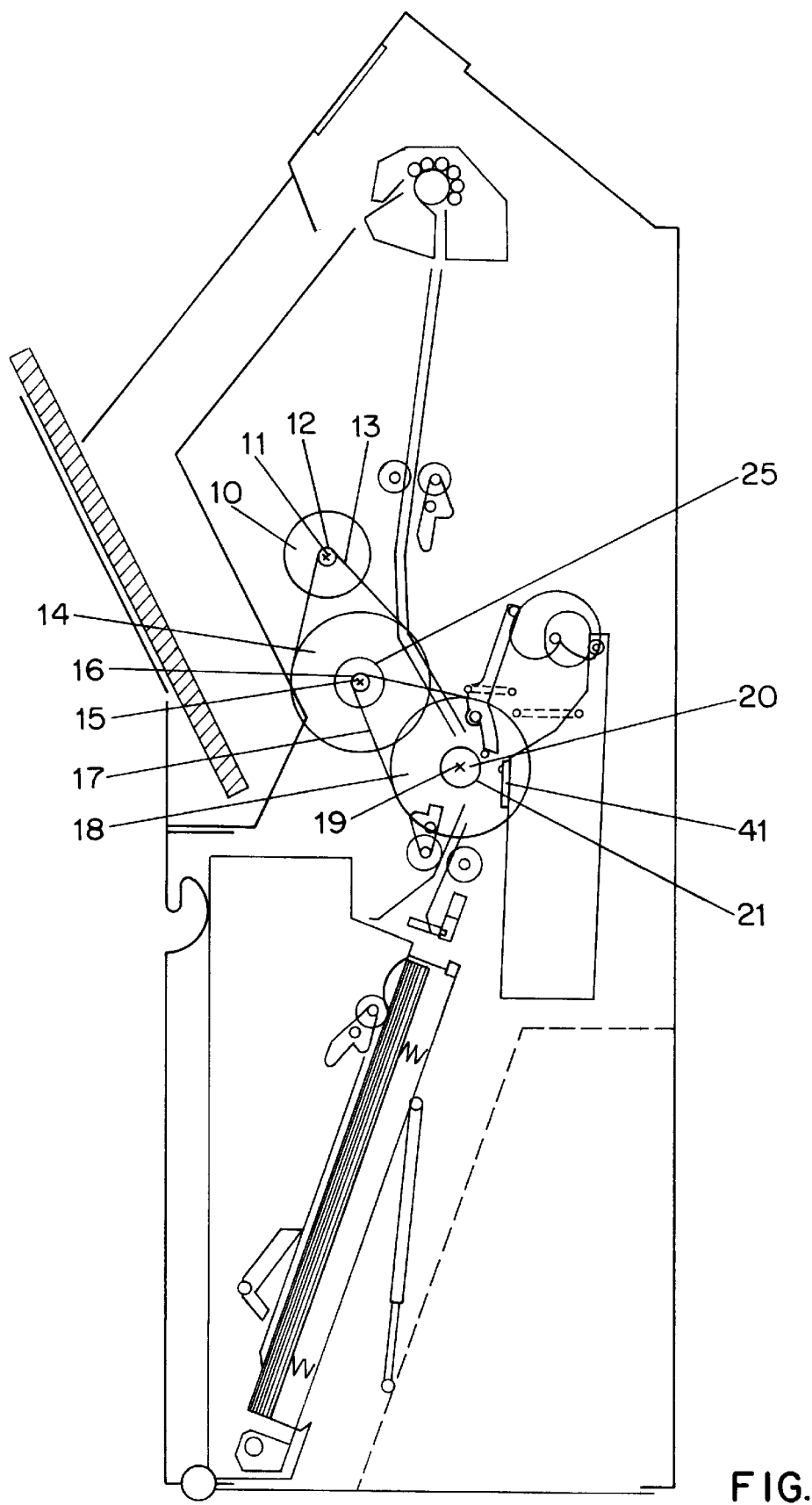
FIG. 3 shows a diagrammatic view of an embodiment of a thermal printer in accordance with the present invention.

FIG. 3 shows a diagrammatic view of an embodiment of a thermal printer in accordance with the present invention. A motor 10 drives a load 20 via a drive system as described hereinbefore. Load 20 has a surface for conveying a heat-sensitive material. In fact, load 20 is a rotatable drum as is commonly used in thermal printers; a thermal head 41 is spring-biased towards the drum to firmly line-wise contact the heat-sensitive material which is passed between the head and the drum, as described hereinbefore.

Since the thermal printer shown in FIG. 3 comprises the drive system described hereinbefore, it provides an improved image quality, in particular with respect to banding.

EXAMPLE

The following example illustrates the thermal printer and the drive system described hereinbefore.

| Motor 10 | type | pancake DC motor |
|---|---|---|
|  | speed | approx. 150 rev/min |
| Pulley 12 | 30 teeth |  |
| Timing belt 13 | material | a kevlar-reinforced material |
| Pulley 14 | 200 teeth |  |
| Pulley 16 | diameter | 15 mm |
| Flat belt 17 | material | kevlar-reinforced polyurethane |
| Pulley 18 | diameter | 120 mm |
| Encoder 25 | rotational encoder, 3000 pulses/rev, 2 channels |  |
| Load 20 | rotational drum with diameter 35 mm |  |
|  | speed | approx. 2.8 rev/min |

The thermal printer writes an image line approximately every 12 milliseconds; the image resolution is 320 dpi.

Having described in detail preferred embodiments of the current invention, it will now be apparent to those skilled in the art that numerous modifications can be made therein without departing from the scope of the invention as defined in the appended claims.

| Parts List | |
|---|---|
| 10 | motor |
| 11 | shaft |
| 12 | pulley |
| 13 | timing belt |
| 14 | pulley |
| 15 | shaft |
| 16 | pulley |
| 17 | flat belt |
| 18 | pulley |
| 19 | shaft |
| 20 | load |
| 21 | surface |
| 25 | rotational encoder |
| 30 | optical slit sensor |
| 31 | slit |
| 32 | axis |
| 33 | axis |
| 34 | axis |
| 41 | thermal head |

What is claimed is:

1. A method for controlling the angular velocity of the output shaft of a motor, the method comprising:
   rotating the motor output shaft at a first angular velocity;
   driving a first transmission using the motor output shaft;
   driving an intermediate shaft at a second angular velocity using the first transmission;
   driving a second transmission using the intermediate shaft, the second transmission being different from the first transmission;
   driving a load using the second transmission;
   converting the second angular velocity into a position signal; and
   controlling the first angular velocity as a function of the position signal.

2. The method according to claim 1, further comprising driving the load at a third angular velocity which is less than the second angular velocity.

3. The method according to claim 1, wherein the converting step comprises using a rotational encoder.

4. The method according to claim 1, wherein the first transmission includes a first belt for driving the intermediate shaft, and the second transmission includes a second belt for driving the load.

5. The method according to claim 1, wherein the second transmission includes a flat belt for driving the load.

6. The method according to claim 1, further comprising:
   measuring the transmission ratio of the second transmission; and
   converting the position signal and the transmission ratio of the second transmission into a drive signal for driving the motor output shaft at the first angular velocity.

7. A system comprising:
   a motor having an output shaft rotatable at a first angular velocity for driving a first transmission;
   an intermediate shaft drivable at a second angular velocity by the first transmission for driving a second transmission, the second transmission being different from the first transmission;
   a load drivably coupled to the second transmission;
   a converter for converting the second angular velocity into aposition signal; and
   a controller for receiving the position signal and for controlling the first angular velocity as a function of the position signal.

8. The system according to claim 7, wherein the first transmission comprises a first belt and the second transmission comprises a second belt.

9. The system according to claim 7, wherein the second transmission comprises a flat belt.

10. The system according to claim 7, further comprising:
    a measurement system for measuring the transmission ratio of the second transmission; and
    a relay system for relaying to the controller the transmission ratio of the second transmission.

11. A thermal printer comprising:
    a motor having an output shaft rotatable at a first angular velocity for driving a first transmission;
    an intermediate shaft drivable at a second angular velocity by the first transmission for driving a second transmission, the second transmission having a transmission being different from the first transmission;
    a load drivably coupled to the second transmission, the load having a surface for conveying a heat-sensitive material;
    a thermal head for heating the heat-sensitive material to produce an image thereon;
    a converter for converting the second angular velocity into a position signal; and
    a controller for receiving the position signal and for controlling the first angular velocity as a function of the position signal.

* * * * *

UNITED STATES PATENT AND TRADEMARK OFFICE
CERTIFICATE OF CORRECTION

PATENT NO. : 6,081,089

DATED : June 27, 2000

INVENTOR(S) : Godon et al.

It is certified that error appears in the above-identified patent and that said Letters Patent is hereby corrected as shown below:

Title Page, Item [30], "May 1, 1997" should read -- September 23, 1997--.

Signed and Sealed this

Eighth Day of May, 2001

Attest:

NICHOLAS P. GODICI

*Attesting Officer*  *Acting Director of the United States Patent and Trademark Office*